United States Patent
Putzolu et al.

[11] Patent Number: 5,968,134
[45] Date of Patent: Oct. 19, 1999

[54] DISTRIBUTED PIPES AND FIFOS IN A MULTIPROCESSOR

[75] Inventors: Franco Putzolu, San Francisco; Srinivasa D. Murthy, San Jose; Alan M. Usas, Los Altos; Gary F. Tom, San Jose; Minoo Gupta, Fremont; Eric G. Strellis, Albany, all of Calif.

[73] Assignee: Tandem Computers Incorporated, Cupertino, Calif.

[21] Appl. No.: 08/947,495

[22] Filed: Oct. 3, 1997

Related U.S. Application Data

[63] Continuation of application No. 08/463,458, Jun. 5, 1995, abandoned, which is a continuation-in-part of application No. 08/377,076, Jan. 23, 1995, abandoned.

[51] Int. Cl.$^6$ .................................................. G06F 15/163
[52] U.S. Cl. .......................... 709/302; 709/304; 709/201; 712/28
[58] Field of Search .......................... 395/800.28–800.31, 395/670, 680–685, 200.31–200.33, 500.44, 500.48; 707/10, 104, 103; 709/300, 302, 304, 100, 201–203, 213–216, 217, 219, 227, 303, 301, 305; 710/3, 129, 260, 268; 711/100; 712/28, 29, 30, 31, 580, 591; 345/335; 364/131

[56] References Cited

U.S. PATENT DOCUMENTS

| | | | |
|---|---|---|---|
| 4,694,396 | 9/1987 | Weisshaar et al. | 709/200 |
| 4,782,442 | 11/1988 | Kojima et al. | 709/220 |
| 4,833,651 | 5/1989 | Seltzer et al. | 365/189.07 |
| 5,247,616 | 9/1993 | Berggren | 709/212 |
| 5,253,342 | 10/1993 | Blount et al. | 709/232 |
| 5,265,250 | 11/1993 | Andrade et al. | 709/101 |
| 5,287,453 | 2/1994 | Roberts | 709/201 |
| 5,303,379 | 4/1994 | Khogi et al. | 395/710 |
| 5,325,492 | 6/1994 | Bonevento et al. | 710/129 |
| 5,329,619 | 7/1994 | Pagé et al. | 709/203 |
| 5,724,512 | 3/1998 | Winterbottom | 709/226 |
| 5,787,300 | 7/1998 | Wijaya | 712/1 |

*Primary Examiner*—John A. Follansbee
*Attorney, Agent, or Firm*—Townsend and Townsend and Crew LLP

[57] ABSTRACT

A multiprocessor that includes a virtual file system providing a file system interface to user application code. This interface allows users to access files in many types of file systems in a consistent, file system-independent manner. In a preferred embodiment, the higher interface of the file system is the Posix file system interface, though it can be any file system interface supporting the capabilities required by a user process. The Posix file system supports regular files, pipes, fifos and special files.

A pipe server, a pipe library and a name server together implement the fifo semantics required by the Posix standard for Posix processes. The present invention provides these fifo capabilities to any process which uses the Posix interfaces.

9 Claims, 6 Drawing Sheets

SEQUENCE OF EVENTS

→ GUARDIAN MESSAGE (1)
→ ACTION PERFORMED (a)

1. LOOKUP NAME
2. CREATE pib
a. CREATES pib
3. RETURNS A fifo_id
4. RETURNS A file_id
b. LIBRARY OPENS FIRST CLIENT

OPS_INIT- INITIAL STATE FOR ALL REQUESTS.

OPS_BLOCKED - REQUEST BLOCKED. FOR EXAMPLE, A READ REQUEST ON A PIB WITH NO DATA BLOCKS IN THIS STATE.

OPS_READY - PREVIOUSLY BLOCKED REQUEST IS READY TO CONTINUE. FOR EXAMPLE, WHEN DATA IS WRITTEN TO A PIB, BLOCKED READERS ARE PUT IN THIS STATE.

OPS_DONE- THE REQUEST IS COMPLETE AND REPLY RETURNED.

5,968,134

DISTRIBUTED PIPES AND FIFOS IN A MULTIPROCESSOR

RELATED APPLICATION

This is a Continuation of application Ser. No. 08/463,458, filed Jun. 5, 1995, now abandoned, which is a Continuation-in-Part of related U.S. application Ser. No. 08/377,076, filed Jan. 23, 1995, naming Putzulo, et al. as inventors, under an obligation of assignment to the assignee of the instant application, now abandoned.

BACKGROUND OF THE INVENTION

The present invention relates to inter-process communications. An understanding of certain inter-process operations, described below, is necessary in order to understand the invention. UNIX® is taken as an example.

Recent years have seen a significant rise in the commercial popularity of the UNIX® operating system. Although UNIX® was originally preferred only by computer scientists, computer science students and other extremely technically proficient computer users, the preference for UNIX® as a commercial programming environment is growing as those students matriculate into the work force and carry their developed preferences with them. Accordingly, it behooves a computer manufacturer to provide a UNIX® or UNIX®-like programming environment along with its proprietary hardware.

Two interfaces which a UNIX® environment typically provides are pipes and fifos. Pipes and fifos are memory-resident first-in, first-out queues of data which cooperating processes may use for communicating with each other without knowing the identity of each other. (In UNIX®, a "process" is the dynamic, run-time embodiment of a program. The program typically resides in a static state on a storage medium such as disk or tape, while the process is loaded into memory and is executing. UNIX® is a multitasking operating system: Many processes can be executing essentially simultaneously.) Both pipes and fifos are file system objects accessed via normal file system calls. Pipes and fifos differ from a regular file system file in that its data is transient: Once data is read from a pipe or fifo, that data cannot be read again.

An important difference between pipes and fifos is that fifos have normal file system file names while pipes do not. As a result, many operations which require a file system file name work for fifos but do not work for pipes.

In UNIX®, a process can create another process by performing the fork( ) system call. The result of a fork( ) system call is the creation of a new process which is a copy of the old process, except inter alia it has its own unique process identification number. This procedure of a process creating a copy of itself is called "forking." In forking, the older process is called the "parent" and the newer process is called the "child." Of course, a parent can have many children, while a child has only one parent.

A pipe is created and opened using the pipe( ) system call. Opened pipes in a process are propagated to child processes upon forking. After one or many forks, all of the descendants of the process which called pipe( ), as well as the process itself, can communicate using the pipe.

A fifo is created using the mkfifo( ) (pronounced, 'make fifo') system call. A call to this system entry point creates an entry for the fifo in the file system. After creation of the fifo, any process with sufficient permission may open (i.e., open( )) the file. Consequently, processes which do not share a common ancestor can communicate using the fifo.

UNIX®, however, has historically been an operating system for uniprocessors: originally the Digital Equipment Corporation's PDP-11, later mainframes, and still later microprocessors with the boom in microcomputers. Even today, only a handful of multiprocessor implementations of UNIX® exist.

In implementations of the prior art, pipes and fifos could be established only between two processes running on the same cpu. For example, the Network File System (NFS) from Sun Microsystems of Mountain View, Calif. permits a process to communicate with other processes only on the same machine.

An implementation of distributed pipes and fifos stands a high chance of performing below a user's expectations.

Still further, an implementation of distributed pipes and fifos significantly complicates error recovery.

Accordingly, one object of this invention is a UNIX-like operating system on a multiprocessor which transparently supports the pipes and fifos found on traditional UNIX®-like implementations.

These and other objects of the invention will be readily apparent to those of skill in the art on reading the disclosure below.

SUMMARY OF THE INVENTION

In one embodiment, the invention is a multiprocessor that includes a virtual file system providing a file system interface to user application code. This interface allows users to access files in many types of file systems in a consistent, file system-independent manner. In a preferred embodiment, the higher interface of the file system is the Posix file system interface, though it can be any file system interface supporting the capabilities required by a user process. The Posix file system supports regular files, pipes, fifos and special files.

A pipe server, a pipe library and a name server together implement the fifo semantics required by the Posix standard for Posix processes. The present invention provides these fifo capabilities to any process which uses the Posix interfaces.

A pipe server is a system process which preferably runs on each cpu in a multi-processor system embodying the invention. A pipe server maintains the control data structures for pipes and fifos located locally, i.e., for pipes and fifos whose memory-resident, first-in first-out data queues are located on the same cpu as is the process of interest (the pipe server here). Using an inter-processor message interface, a pipe server provides I/O services for remote processes desiring access to the pipes and fifos local to the cpu of the pipe server.

All pipe servers and any process potentially accessing the distributed pipes and fifos of the invention incorporate the pipe library. If the process seeks to access a pipe or fifo not local to the cpu of the process, then the pipe library code in the process converts the requested Posix function to a corresponding message for transmission on the inter-processor message interface. The message is forwarded to the pipe server on whose cpu the pipe or fifo is local. Using the inter-processor message interface in the pipe library code, this pipe server provides the requested I/O service for the remote process.

If, however, the process requests Posix access to a pipe or fifo local to the cpu of the requesting process, then the pipe library executes the complete Posix request in the context of the user process. Likewise, a pipe server receiving a message requesting a Posix service for a local pipe or fifo executes that request in its own context, using the pipe library. The pipe library code maintains the local pipe and fifo data control structures, and the pipe server and any local process potentially accessing the pipes and fifos of the invention each contain the pipe library.

An additional component of the present invention is a name server. A name server does name resolution for fifos. The name server also performs all necessary security checks on a fifo when the server performs pathname resolution. The security checks which the name server performs are exactly the same as those security checks performed on other Posix files. Each Posix file system has an associated name server.

DESCRIPTION OF THE PREFERRED EMBODIMENT

Figure 1:
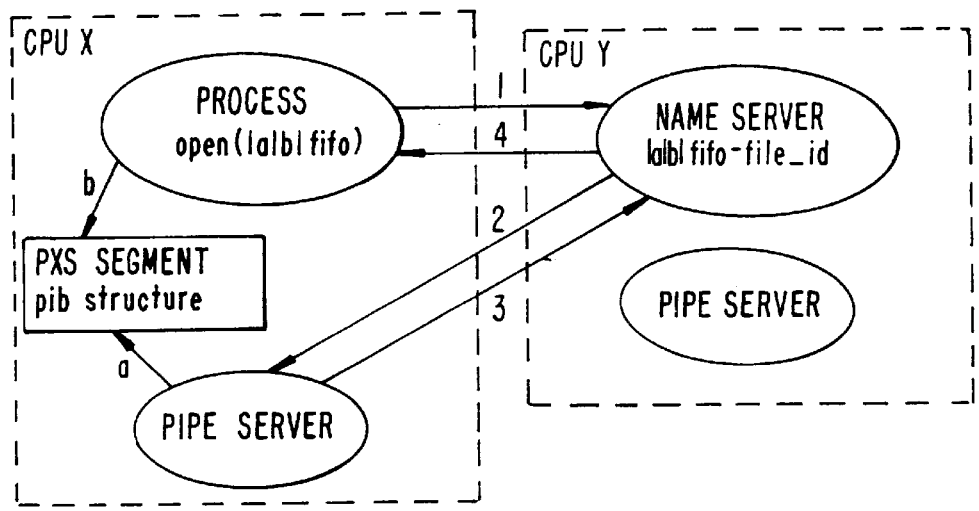
FIG. 1 is an abstract representation of the sequence of events the multiprocessor system of the invention undertakes in response to a call by a process to open a fifo.

The OSS File System offered by the assignee of this patent application implements the Posix file system as specified in the Portable Operating System Interface, Part I ("Posix," International Standard ISO/IEC 9945-1: 1990; IEEE Std 1003.1-1990, incorporated herein by reference). The OSS File System is designed to take full advantage of the loosely coupled and truly distributed architecture of the computer system architectures of the products of the assignee of this patent application. The OSS File System therefore supports the concept of distributed pipes and fifos.

There is a single instance of a fifo which has been registered in a Posix file system directory on an entire Expand network available from the assignee of this patent application. As a result, a process on any one node of the network may read data which another process has written to a fifo. In other words, Posix processes which wish to communicate with each other across the Expand network may use a fifo.

The present invention supports pipes only for Posix processes running on a single node, though the processes themselves can be running on different cpus.
Overall Design A pipe server and a pipe library of the present invention together implement the complete fifo semantics required by the Posix standard for Posix processes. The present invention provides these fifo capabilities to any process which uses the Posix interfaces.

A pipe server is a system process which preferably runs on each cpu in a multi-processor system embodying the invention. A pipe server maintains the control data structures for pipes and fifos located locally, i.e., for pipes and fifos whose memory-resident, first-in first-out data queues are located on the same cpu as is the process of interest (the pipe server, here). Using an inter-processor message interface, a pipe server provides I/O services for remote processes desiring access to the pipes and fifos local to the cpu of the pipe server. (Remote processes are processes running on a cpu other than that on which the process of interest is running. Here again the process of interest is the pipe server.)

All pipe servers and any process potentially accessing the distributed pipes and fifos of the invention incorporate the pipe library. If the process seeks to access—in a Posix-specified manner—a pipe or fifo not local to the cpu of the process, then the pipe library code in the process converts the requested Posix function to a corresponding message for transmission on the inter-processor message interface. The message is forwarded to the pipe server on whose cpu the pipe or fifo is local. Using the inter-processor message interface in the pipe library code, this pipe server provides the requested I/O service for the remote process.

If, however, the process requests Posix access to a pipe or fifo local to the cpu of the requesting process, then the pipe library executes the complete Posix request in the context of the user process. Likewise, a pipe server receiving a message requesting a Posix service for a local pipe or fifo executes that request in its own context, using the pipe library. The pipe library code maintains the local pipe and fifo data control structures, and the pipe server and any local process potentially accessing the pipes and fifos of the invention each contain the pipe library.

Figure 2:
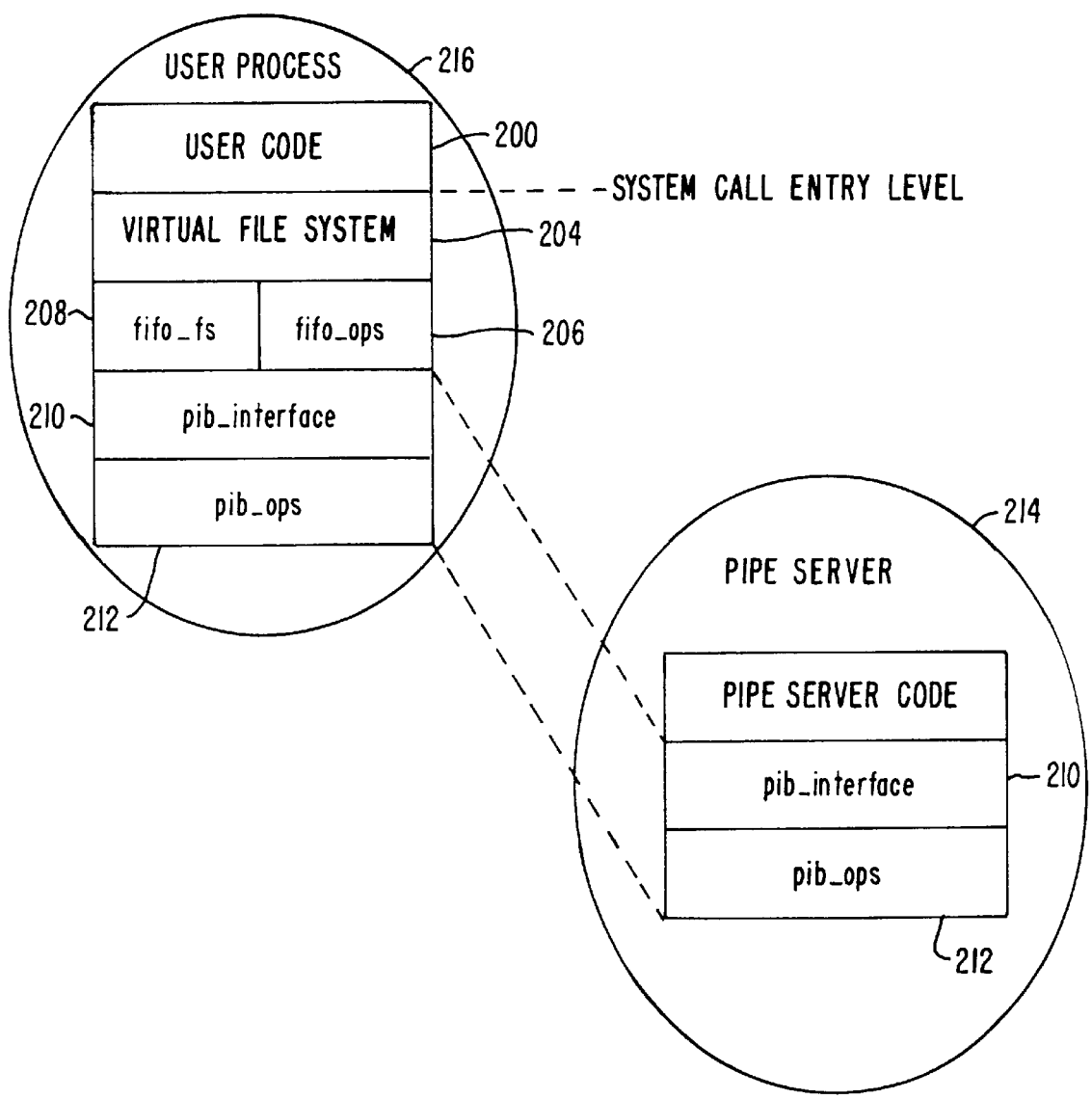
FIG. 2 illustrates the layers of software within a process and within a pipe server according to the present invention.

An additional component of the present invention is a name server. A name server does name resolution for fifos. The name server also performs all necessary security checks on a fifo when the server performs pathname resolution. The security checks which the name server performs are exactly the same as those security checks performed on other Posix files. Each Posix file system has an associated name server.
Organization of the Fifo File System FIG. 2 illustrates the layers of software within a user process 216 and a pipe server 214 according to the present invention. Each layer may request services from the layer directly above or below, though in most cases a layer only requests services from the layer below. For a given layer, the interface to the next-lower layer is herein termed the "lower interface" and the interface to the next-higher layer is termed the "higher interface." Each layer provides a well-defined interface which specifies all the assumptions which the layer may make about its caller and which the caller may make about the layer. An interface includes a set of data types and a set of callable functions. In addition to parameters, a function in an interface may include rules about the global state, e.g., semaphores which the caller must possess while using the function.

In addition to its interface, each layer may contain private data structures and functions. To insure modularity, these private data structures and function may be used only within the layer.

Processes such as the process 216 are typically application programs such as a database, word processor or file system backup program. A call to an operating system entry point (e.g., Posix open( )) occurs in the code 200 which the user writes. This user code 200 performs operations on pipes and fifos (as well as other file types) by using the Posix file system interface directly or indirectly through some library providing a programmer-friendly interface to the system entry points. The user code 200 is not a part of the invention.

The invention includes a Virtual File System (VFS) 204 which provides a file system interface to the user application code 200. This interface allows users to access files in many types of file systems in a consistent, file system-independent manner. In a preferred embodiment, the higher interface of the file system 204 is the Posix file system interface, though it can be any file system interface supporting the capabilities required by the user process 216. The Posix file system supports regular files (i.e., a file which is a randomly accessible sequence of bytes, with no further structure imposed by the file system), pipes, fifos and special files (i.e., files through which processes can access hardware devices such as disk drives, terminals, etc.).

To accomplish its task, the VFS 204 invokes lower-level file system-dependent layers of software such as layers 206 and 208. The VFS 204 includes important data structures which the lower, file system-dependent layers use.

In the preferred embodiment, these data structure are not part of the Posix file system higher interface and the user code may not refer to or use these data structures. These VFS data structures include a Posix open block, a vnode and various semaphores (all not shown). A Posix open block contains the information about the open state of an open file. While a file system-dependent layer may extend this block, the VFS 204 itself does not modify the file system-dependent extension.

Vnodes contain per-file information representing a pipe or fifo in the VFS. Like a Posix open block, a vnode can contain a file system-dependent extension which the VFS ignores. Each file system implements a complete set of vnode operation (VOP) functions (not shown) which the VFS uses to perform file system-dependent operations. In a preferred embodiment, for example, the fifo ops layer 206 defines VOP functions for pipes and fifos.

The VFS interface 204 includes semaphores useful for synchronizing access to VFS data structures.

In a preferred embodiment, the VFS 204 also provides functions for operating on vnodes and Posix open blocks. For example, the VFS provides functions which add vnodes to hash lists and others which use the hash lists to efficiently find vnodes.

The fifo ops layer 206 supports the VOP interface which the VFS uses to request file system-dependent operations for a fifo or pipe. Each of the fifo ops functions operates on a single pipe or fifo. Thus, most functions receive a vnode and a Posix open block as input parameters. A fifo ops function can, however, take additional parameters. For example, fifo read requires the number of bytes to read and the location to store the data that get reads.

Each function returns a Posix completion code and preferably a completion code for the underlying operating system (here, Guardian, available from the assignee of this patent application).

The responsibilities of the fifo ops layer 206 include requesting the underlying pipe control block interface layer 210 to manipulate pipe control blocks; manipulating the fifo file system extensions to Posix open blocks and vnodes (including synchronizing access to a Posix open block with semaphores); requesting the name server associated with the file system to remove fifo file identifiers after the pipe control block interface 210 indicates that the corresponding pipe control blocks have gone away; requesting the name server to update the access, status change and modification times attributes of open fifos when the pipe control block interface 210 indicates that these times should be updated; and returning indications requesting the VFS layer 204 to retry an open request if the pipe control block for a fifo being open has gone away. These responsibilities are further explained below.

The fifo fs layer 208 includes all the functions required to set up the file system-dependent parts of the Posix open block and vnode data structures. For example, fifo fs layer 208 includes the function which returns the length of the file system-dependent part of the Posix open block data structure.

The pipe control block interface layer 210 implements the concept of a request for an operation on a pipe control block (described below). A local request accesses a pipe control block on the requesting process' cpu. The pipe control block interface layer 210 calls the pipe control block ops layer 212 directly.

The performance of some local requests requires the invocation of the pipe control block ops layer 212 a multiple number of times in sequence. Each invocation of the layer 212 is herein termed a ("Pib" operation." "Pib" is a contraction of "pipe control block." For example, for local blocking requests such as a read from a pipe control block, the pipe control block interface layer 210 blocks between pib operations. This is further described below.

In comparison, a remote request accesses a pipe control block on another cpu. The pipe control block interface layer 210 in the requesting process sends the request in a message to the pipe server 214 on that remote cpu, and that pipe server's pipe control block interface layer 210 reads the request message and invokes the pipe control block ops layer 212 on that remote cpu.

The capabilities which the pipe control block interface layer 210 provides to the pipe control block ops layer 212 include the following (These capabilities enable the pipe control block ops layer 212 to run in the context of a pipe server 214 or in the context of a user process 216: reading data associated with a request; replying to a request; and continuing a request. In the pipe server, data is read from a message and the reply is packaged as a message while in a user process, data is read from the caller's data buffers and the reply is moved to the caller's data buffers. As to continuing blocked requests, an unblocked request is put on a ready list in a pipe server and a blocked user process is awakened.

The pipe control block interface 210 also provides a function whereby a pipe server 214 can read requests sent by a user process 216.

If a process receives a signal while the pipe control block interface layer 210 is blocked between pib operations, the interface layer 210 requests that the pipe control block ops layer 212 cancel the outstanding request. If a process 216 receives a signal while its pipe control block interface layer 210 is waiting for a pipe server 214 to reply to a request, the interface layer 210 requests that the pipe server 214 cancel the outstanding request.

The pipe control block ops layer 212 implements the non-blocking operation required to support the lower interface of the pipe control block interface layer 210. The operations are non-blocking in order to allow the pipe server 214 to execute them without its blocking. The functions in the pib ops layer 212 take an operation data structure (described below) as a parameter. This operation data structure completely describes the pib operation which the requesting process wishes to perform.

The pipe control block layer 210 begins executing a request by invoking a (possibly first-in-a-sequence) non-blocking operation in the pib ops layer 212. After this pib operation, the pipe control block ops layer 212 returns the Posix (and Guardian) completion code for the pib operation, an indication of the next operation to invoke, if any, and an indication whether the caller should block before invoking that next operation.

As implied above, the pipe control block ops layer 212 supports cancelling outstanding requests.

Vnodes in the Fifo File System

The Posix file system supports directory entries for fifos but not pipes. Like the directory entries for disk files, the directory entries for fifos last from the time the fifo is created until its last link is removed.

Some system calls affect the directory entry for a fifo. For example, the Posix chmod( ) system call which sets the access permissions for a file. Other system calls affect the resource which the fifo represents. A system call to write to a fifo, for example, adds some data to the fifo's memory-resident data queue. The file system which contains the fifo's directory entry (e.g., the Posix or NFS file system) must perform the directory-affecting operations. The fifo file system itself must perform the operations which affect the fifo resource itself. To support these two types of operations, the present invention allocates two vnodes (described below), one for directory entry operations and one for operations on the fifo.

Figure 3:
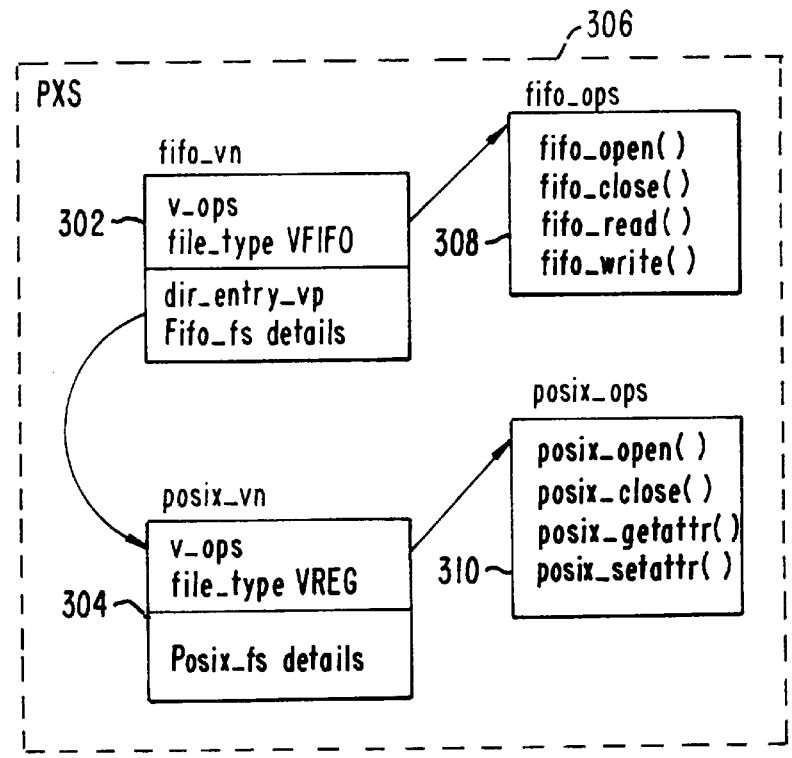
FIG. 3 schematically represents vnodes in the fifo file system of the invention.

FIG. 3 schematically represents vnodes in the fifo file system of the invention. These vnodes are created in a Posix Extended Segment (PXS) 306, an extended segment which is allocated and initialized on a cpu, preferably during boot-up. The PXS 306 contains control blocks (such as vnodes) that are shared by user processes and system processes of the cpu. Preferably, the PXS 306 includes a fixed-length header and a pool and is locatable via an absolute pointer stored in system data space. The PXS pool is used to store Posix open blocks, pipe control blocks, the pipe table (the table of (pointers to) pipe control blocks), and vnodes.

FIG. 3 shows the two vnodes 302, 304 needed to represent a fifo which exists in a Posix file system directory (not shown). Fifo vnode 302 enables operations affecting the fifo resource while Posix vnode 304 enables directory-affecting operations. These vnodes are created in the PXS 306 the first time a process on a cpu opens or uses the fifo. Subsequent opens or uses of the fifo on the same cpu will refer to these same vnodes. System calls to open the fifo on another cpu will create or refer to a copy of the vnodes local to that other cpu. When the last user on a cpu closes the fifo (using the close( ) system call), the vnode data structures are destroyed.

The VFS performs operations on the fifo resource by executing the appropriate function in the fifo ops layer 206. For example, when performing a Posix write( ) system call on a fifo, the VFS invokes the fifo ops write operation of the fifo ops layer 206. The fifo ops write operation has the responsibility for transferring the data the caller wishes to write to the fifo. The fifo ops write and other fifo ops operations such as open, close, read and write are discussed fully below.

The first process on a cpu to refer to a pipe or fifo creates the vnodes 302, 304. Subsequent processes on the cpu use the existing vnodes 302, 304 by incrementing a reference count. When the last process on a cpu stops using a pipe or fifo's vnodes, that process frees the vnodes 302, 304. To allow a process to efficiently find a fifo vnode 302 for a particular fifo on its own cpu, a hashed mapping from the fifo's fifo identifier to the fifo's vnode. The hashing function indicates the fifo vnode 302 of a particular fifo exists on the caller's cpu.

The fifo vnode data structure 302 represents both pipes and fifos and preferably contains the following information: a pointer to the vnode 304 for the directory entry of the fifo (this reference would be NULL for pipes); a flag indicating whether the fifo vnode 302 represents a fifo or a pipe; the phandle of the name server for the file system of the fifo; and the phandle of the pipe server which has the pipe control block (described below) for the pipe or fifo which the fifo vnode 302 represents. (A phandle is a unique, though not necessarily constant, inter-processor identifier for a process. A phandle for a service may change, for example, if a backup process for the service takes over.)

Consider an invocation of the Posix stat( ) system call, which obtains status information about a file named in one parameter and writes that information to an area pointed to by another parameter. This operation affects the directory entry for the fifo. Assume that the vnodes 302, 304 for the fifo already exist on the local cpu and that, therefore, the stat( ) system call refers to the existing vnodes 302, 304 rather than requiring the construction of new ones. In performing the stat operation, the VFS calls the fifo ops function getattr( ) via the fifo ops data structure 308. The fifo fops data structure 308 associates Posix functions affecting a fifo resource with corresponding file system-dependent functions.

In addition to returning the status information, the fifo ops getattr operation must permanently store times attributes information with the directory entry for the fifo. To store this information, the fifo ops getattr operation invokes the Posix setattr operation using the normal vnode interface. Posix ops data structure 310 associates Posix functions affecting a fifo file entry with corresponding file-system-dependent functions.

This design isolates the fifo file system's implementation from the implementation of the file system which contains a particular fifo file. The fifo file system need not know what kind of file system contains a particular fifo file in order to perform operations on the special file's directory entries.

Data Structures

Active pipes and fifos are represented by control blocks or "pipe control blocks". Each process which opens an otherwise unopened fifo or calls pipe( ) to create and open a pipe causes the creation of a pipe control block. Each such opening process is termed a client of the pipe and has a corresponding client data structure in the pipe control block data structure. The client data structure, among other things, describes how each client process is using the pipe or fifo. Because of the open file duplication involved in forking, the result of a client process' forking is the addition of the child process as a client of the pipe or fifo.

As described above, client processes may share open files as a result of forks. According to the invention, the client processes sharing the open file need not reside on the same cpu. Nonetheless, changing an attribute of a shared open file must affect all the sharing processes. With pipes and fifos, an important shared attribute subject to change is the flag indicating whether I/O on the pipe is non-blocking. To support shared opens of pipes and fifos, a system embodying the present invention stores the attributes of an open file that can be shared in an open control block. All client processes sharing the open file refer to the same open control block, preferably through the client data structure.

The present invention labels each open which a process performs with a unique open identifier. Uses of a pipe or fifo other than opens have a single, reserved open identifier which indicates that the use is other than an open. Since the present invention forces non-open uses of a pipe or fifo through a single Posix system call, enforcement of the rule that a single process may have at most one non-open use of a pipe or fifo at any given time is easy. The result is that a pair consisting of a client process identifier and an open identifier uniquely defines a particular use of a pipe or fifo.

All requests to access a pipe control block on behalf of a process contain such a pair.

The Posix file system uses the fifo file identifier for a pipe or fifo to locate the vnodes 302, 304 of the pipe or fifo. These vnodes 302, 304 are locatable by a hash table. This requires that the fifo file identifier must be unique within an Expand network. Also, the pipe control block ops layer 212 uses the fifo identifier to locate a pipe control block. Therefore, the fifo identifier contains the pipe control block's cpu number and the block's index in the pipe table.

Vnodes 302, 304 for a pipe or fifo may exist on many cpu's. The failure of the cpu containing the pipe control block may not affect these vnodes. Accordingly, VFS functions may continue to reference the pipe control block—even after the failing cpu deletes that block. A pathological condition results if a new pipe control block is created on the same cpu after the cpu restarts. To resolve this problem, the present invention requires that fifo identifiers be unique for every instance of a pipe control block creation. The present invention achieves this requirement by adding a unique sequence number to the fifo identifier.

The pipe control block for a pipe or fifo exists on a single cpu. The pipe control block ops layer 212 on that cpu creates the pipe control block. After such a creation, the pipe control block ops open( ) function creates a fifo identifier which identifies the new pipe control block. The new fifo identifier must differ from existing fifo identifiers, even those created prior to an earlier cpu failure. To satisfy this requirement, the present invention restricts the pipe control block ops layer 212 to execute only after the pipe server initializes its global data structures. In other words, after a cpu failure, the pipe server must be initialized on that cpu before any fifo identifiers are generated. To generate a unique sequence number for fifo identifiers created across cpu deaths and restarts, the pipe server's phandle becomes a part of the unique sequence number. The phandle of a process is unique across the cpu ups and downs. Also, the phandle of the pipe server preferably contains the system number and the cpu of the pipe server which are the same as the system and cpu of the pipe control block.

In short, the fifo identifier for a pipe or fifo includes the pipe server phandle, the pipe table index for the pipe control block and the sequence number for the pipe control block since the last cpu load. The sequence number is preferably a 32-bit number.

The present invention maintains a number of semaphores in PXS 306, including the pipe semaphore, the allocation semaphore and the posix open block semaphore.

The pipe server and the system library use the pipe semaphore to synchronize access to pipe and fifo data structures. The semaphore protects all the data structures associated with pipes and fifos, including the pipe table, the pipe control blocks, the client and operation data structures, and the ready list. As a result, at any given time only one process can access the pipe control blocks on any given cpu and processes must give up the semaphore before blocking.

The allocation semaphore synchronizes the allocation and deallocation of memory in the PXS segment. The allocation semaphore also synchronizes the use of data structures in the PXS segment.

The processes use the Posix open block semaphore to synchronize access to the Posix open block data structure.

The PXS 306 pool also contains a number of data structures, including the pipe operation data structure, the pipe interim data buffer and the pipe ready list. The pipe server uses the pipe operation data structure to read requests for services and uses the pipe interim data buffer to read in a data buffer if the data buffer associated with the pipe control block does not have enough space at the time. The pipe ready list is a list of unblocked pipe control block ops layer 212 operations for the pipe server to execute. The pipe control block ops layer 212 adds entries to and deletes entries from this list.

In a preferred embodiment, the pipe control block data structure includes the following information: a fifo identifier, a unique identifier of the pipe control block, which includes the system number, the cpu number, the pipe control block number (i.e., index in the pipe table) and a sequence number; a flag indicating whether the pipe control block describes a fifo; a client count, the total number of clients currently using the pipe control block due to calls to the Posix open( ) and fork( ) system calls; a client read count, the total number of current clients using the pipe control block for read or read/write access; a client write count, the total number of clients using the pipe control block for write or read/write access; a client list, a list of current clients (Each entry in this list represents an active use of the pipe control block by a process. For example, when a process calls open( ) an entry is added to the client list. The entries in this list are client data structures.); a pipe control block buffer pointer, a pointer to a FIFO data buffer allocated in the PXS 306; first and last indices, boundaries of current data in the pipe control block buffer; an open-waiter head, the first entry in the list of open operations waiting for another type of opener, e.g., an opener with read-only access waiting for an opener with write-only access; a write-waiter head, the first entry in the list of write operations waiting to write to the pipe control block_buffer (The writes blocked because the pipe control block_buffer was full at the time of the operation.); a read-waiter head, the first entry in the list of read operations waiting to read from the pipe control block_ buffer (The reads blocked because the pipe control block buffer was empty.); a name server block pointer pointing to name server-related information (not used for pipes); a directory entry file identifier, the file identifier for a fifo's directory entry; a fifo file identifier, the fifo file system file identifier for a pipe or fifo; a unique sequence number to distinguish this use of the pipe control block's pipe control block number (This sequence number is a duplicate of the fifo identifier.); a local copy of the access time; the name server's last copy of the access time (not used by pipes); the local copy of the fifo or pipe's modify time; the name server's last copy of the fifo's or pipe's modify time (not used by pipes); the local copy of the pipe's or fifo's create time; the name server's last copy of the pipe or fifo's create time (not used by pipes); and a next open identifier, a counter for assigning open identifiers for the client structure.

A client structure describes a single use of a pipe or fifo and is allocated in the PXS 306. In a preferred embodiment, the client data structure includes the following information: the phandle of the user process using the pipe or fifo; a pipe control block identifier of the pipe control block to which the client belongs; a pointer to the open control block containing the attributes of the open, if the client structure represents an open (The attributes include an open identifier, a unique identifier which processes sharing the fifo or pipe file descriptors may share; the open control flags; and a count of the clients sharing the open. If one client changes the open flags, then all the other clients sharing the open see the change.); the sequence number of the last fifo function successfully executed; the sequence number of the last fifo function successfully cancelled; and the operation structure used for queuing blocked requests.

An operation data structure completely describes the state of a request on a pipe or fifo. All the functions in the pipe control block ops layer 212 use an operation data structure. The pipe library or the pipe server itself can initialize operation data structures.

In a preferred embodiment, the operation data structure includes the following information: an operation request type, the type of the operation being described by this data structure (The values could be OPEN, READ, WRITE, CLOSE, etc.); and an operation state, one of INIT, BLOCKED, READY, and DONE.

The following information preferably included in the operation data structure associates a given operation with a client: a file identifier, the fifo identifier part of which identifies the pipe control block on which this operation will be performed; the process identifier of the process which initiated the operation; an open identifier to uniquely identify the client given the above information; a request sequence number, a sequence number generated by the fifo ops layer 206 for each invocation. (This is used to identify cancel and duplicate requests from a client.); and a flag indicating whether the operation is being performed locally form the system library.

The following information preferably included in the operation data structure chains this operation structure on various lists: an operation list type, identifying which list this operation belongs to (i.e., blocked openers, readers, writers or the ready list); a pointer to the operation data structure at the head of the list; and a pointer to the next operation data structure chained in the list to which this operation belongs.

The following information preferably included in the operation data structure stores the request and reply information. These fields may be filled in by the library or the pipe server: a message id which the pipe server fills in after reading the initial control information; the length of the request data; a pointer to the request data (If the library performs this operation, the library uses this field to fill the user's buffer in write( ) operations); the maximum length of the reply control; a pointer to the reply control buffer (which the library fills in for local operations); the maximum length of reply data and a pointer to the reply data buffer (which the library fills in for local operations).

A name server block stores name server-specific information and is also allocated in the PXS 306. As explained above, the pipe control block data structure points to one of these. In a preferred embodiment, the name server block data structure includes the following information: the phandle of the primary name server which has an "I am OK" message pending with the pipe server; the well-known name of the name server process (primary and backup) pair whose primary phandle is stored as suggested above; the message identifier of the pending "I am OK" message; the tag provided to this block by the pipe server; a reference count of the number of active fifos registered with this particular name server; and a pointer to the next block of the name server.

Figure 4:
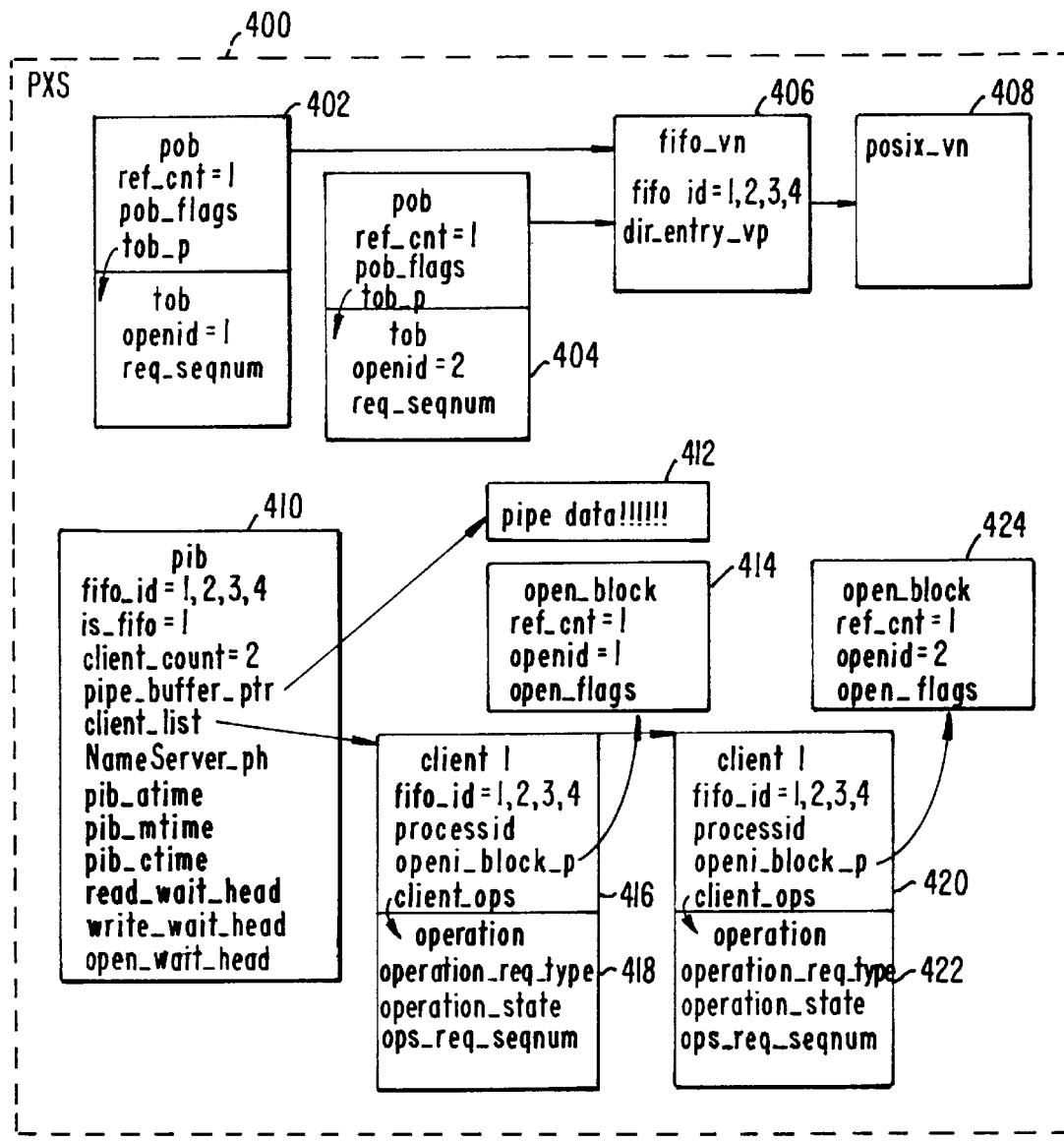
FIG. 4 is a representation of fifo data structures in a particular state.

FIG. 4 sketches certain fifo data structures when a fifo has been opened by two processes. Each open results in the creation of a Posix open block 402, 404. Each Posix open block 402, 404 for the fifo refers to fifo vnode 406 for the fifo in the fifo file system. The fifo vnode contains a fifo identifier and directory entry vnode pointer. The fifo identifier in the fifo vnode 406 is used to reference the pipe control block 410. The figure also shows the relationship between the pipe control block 410, the client data structures 416, 420 and the operation data structures 418, 422.

The Name Server

Each fifo is registered in a single Posix file system. The name server for the file system containing a fifo can provide users of the fifo several services described below.

The name server maintains the vnode information and directory entries for the fifo in the file system's directory tree. This information is stored in the PXINODE and PXLINK files for the file system. The PXINODE file describes inodes of directories and files. PXINODE records include some Posix-defined fields which are a part of the Posix <sys/stat.h> stat data structure. A field of the PXINODE record (preferably the st_mode field) indicates that the inode describes a fifo.

A process registers the fifo in the file system by performing a Posix mkfifo( ) call. When a process removes the last link to the fifo using a Posix unlink( ) call, deletion of the fifo from the file system is a result.

The name server also performs Posix directory entry operations including access( ), chmod, chown( ), link( ), mkfifo( ), pathconf( ), rename( ), unlink( ) and utime( ). The name server also does name resolution and permission checking.

The name server requests the pipe server to create a fifo's pipe control block and return the fifo identifier of the pipe control block when a process opens an unopened fifo. The name server constructs a file identifier which contains this fifo identifier and returns the file identifier to the caller performing name resolution.

During the time the request to the pipe server is outstanding, the name server blocks other name resolution requests involving the same fifo. When the pipe server responds with a fifo identifier, the name server unblocks the blocked requests and includes the newly created file identifier in the replies to the blocked request.

The name server deletes the file identifier associated with an open fifo when the pipe control block for the fifo is destroyed. This occurs when the last process using the fifo closes it and sends the name server a 'last close' request. The pipe control block is also destroyed when the cpu containing the pipe control block fails, so the name server must monitor the pipe control block's cpu.

The name server permanently stores the time attributes of a fifo. These times are cached in the pipe control block while the fifo is open. The name server updates the times when it receives a 'last close' message from the last process to close a fifo.

When processing a Posix utime( ) operation on an open fifo, the name server sends the new times to the pipe server for the pipe control block which contains the cached times.

The name server performs all necessary security checks on a fifo when it performs path name resolution. The checks performed on a fifo are exactly the same as those performed on a disk file.

The System Library

The fifo ops layer 206, the pipe control block interface layer 210 and the pipe control block ops layer 212 are completely executed in the context of a user process if the pipe control block to the fifo of interest is on the same cpu as the user process. This is local execution.

If the pipe control block is on another cpu, the pipe control block interface layer 210 sends a request containing an operation data structure to the pipe server 214 on the cpu which contains the pipe control block. This is remote execution. In remote execution, the pipe server 214 executes the pipe control block ops layer 212 upon receipt of the request using the operation data structure.

The pipe control block interface functions and the pipe control block ops layer functions take an operation data structure as the input parameter. In a preferred embodiment, the operation data structure specifies: the request to be performed; whether the request is local or remote; the fifo identifier, the process identifier and the open identifier uniquely identifying the relevant pipe control block, client block and open; the request sequence number, obtained from a counter in the Posix open block by every invocation of a fifo ops function (A request to be cancelled is identified by its sequence number.); and the location for the reply.

The fifo ops layer 206 checks the return status from the pipe control block interface layer 210 and decides whether it needs to send a times update message or a 'last close' message to the name server. If a messages needs to be sent, the fifo ops layer 206 will assemble and send the message.

The fifo ops layer 206 invokes a pipe control block interface function, herein termed "PerformRequest( )" to execute requests on a pipe control block. During local execution, the interface function PerformRequest running within a user process invokes the pipe control block ops layer 212 to perform one or more non-blocking pib operations. If the request blocks (e.g., a fifo read( ) request blocking until data is written to the pipe control block), the pipe control block interface 210 waits. During remote execution, the interface function PerformRequest ships the request to the pipe server and blocks until it replies.

The general sequence of steps which PerformRequest are as follows: The PerformRequest synchronizes access with the pipe server via the pipe semaphore. If execution is local, PerformRequest calls another function, herein termed "RequestMyCpu( )," to invoke a pib operation. If execution is remote, PerformRequest calls the function herein termed "RequestOtherCpu( )" to send a request using the operation data structure to the pipe server. PerformRequest then waits for the request, local or remote, to complete.

If a signal comes in while the request is blocked, PerformRequest cancels the request.

Upon successful completion, Perform returns the reply to the user.

When a request blocks, the pipe control block ops layer 212 returns a blocked status and the next operation to invoke. RequestMyCPU then waits for an LPIPE or LSIG signal event. LPIPE events are generated from either the pipe server or from another user process executing a pipe control block ops layer function. For example, when a pipe control block read operation blocks, RequestMyCpu( ) waits. Later, a pipe control block write operation running in the pipe server or a user process will generate an LPIPE event to continue the blocked read. After receiving the event, RequestMyCpu( ) invokes the next pipe control block operation in the request. An LSIG event is generated upon receipt of a signal and the blocked request is cancelled.

The RequestOtherCpu( ) waits for either a reply from the pipe server or an LSIG event to cancel the request.

To cancel a pending request, the pipe control block interface layer 210 sets up a cancel operation data structure which includes the operation control information and the sequence number of the request to be cancelled. RequestMyCpu( ) invokes the pipe control block cancel operation and RequestOtherCpu( ) sends a message to the pipe server.

The Pipe Server

Pipe Servers are system processes that support the remote operation for pipes and fifos. A pipe server 214 provides to user processes running in different cpus a message interface supporting pipe control block interface requests.

In its main loop, a pipe server 214 preferably proceeds as follows: The pipe server 214 reads a communications interface to get the next request for a pib operation. The pipe server 214 then synchronizes with the system library using the pipe semaphore. The server 214 then executes the requested pib operation. The pib operation includes identifying the client process using the fifo identifier, the process identifier and the open identifier. The pib operation also updates and allocates the pipe control block and buffer of the pipe or fifo. The pib operation then wakes up local user processes that are in the blocked state, using the LPIPE event, moves unblocked remote operations to a ready list for later processing and generates an LPIPE event for the pipe server. The pib operation queues the operation onto one of the wait lists if the request is to be blocked, setting up the next pib operation to be performed in the operation data structure to be executed when the operation becomes unblocked, and returning to the top of the loop to listen on the communications link for the next request. The pib operation sends a reply message to the requesting user process if the request successfully completes.

For the pipe server 214, the pipe control block interface layer 210 preferably offers two services for pib operations: a read( ) service and a do( ) service. The read( ) service reads a request incoming on the communications link or dequeues the operations chained on the ready list. The do( ) service invokes the underlying pipe control block ops layer 212, using an operation data structure.

When the pipe control block ops layer 212 is blocked, the layer 212 returns a blocked status to the do( ) function. The pipe server 214 must then either wait for an LPIPE event or perform another operation, preferably from the ready list. As described above, the pipe control block ops layer 212 generates an LPIPE event when, running in the context of another user process, the layer 212 unblocks operations and chains the unblocked operations onto a ready list. The pipe server 214 in turn dequeues operations on the ready list.

Only the pipe server 214 dequeues operations that are chained on the ready list. The pipe server 214 invokes the next operation to be execution upon becoming unblocked.

One of the requests which a pipe server 214 handles is a request to cancel a service. A cancel request can arrive at the server 214 before the corresponding request which is to be cancelled. In order to detect this out-of-sequence arrival, the system pipe library includes a sequence number in every request sent to a pipe server 214. The cancel request includes the sequence number of the request to be cancelled. Every client data structure tracks the sequence number of the last cancelled request as well as the sequence number of the last request processed.

The pipe server 214 monitors the cpus of all the remote clients of each pipe control block, in part to determine when any of the cpus goes down. The server 214 processes a cpu down message in two steps. In the first step, all the client data structures representing user processes on the dead cpu are deleted from their pipe control blocks, if they were neither blocked nor had partially completed operations, that is to say, there was no reply outstanding. The user requests which were blocked or were partially completed are set up to execute the next operation which will reply to their outstanding requests. The blocked operations from the remote user processes are queued on to the ready list and the local user processes are awakened by an LPIPE event.

In the second step, the next pipe control block function is executed from the main loop of the pipe server 214 for operations which were added to the ready list and also executed by the system pipe library which wakes up as a result of the LPIPE event. This operation will reply to the outstanding request and deallocate the associated client data structure and the pipe control block structure if no more clients remain.

Every name server servicing a fifo has an "I am OK" message outstanding with the pipe server serving the fifo. If the name server dies for any reason (due to cpu death or its own process death), the message system of the underlying operating system cancels this message. This cancel message serves as an indication to the pipe server that at least one member of the name server process pair is dead.

Upon receiving this cancel message the pipe server takes the actions described below. The pipe server will perform a DCT lookup by phandle to determine if the name server process pair is still active. If the name server phandle is changed due to the backup takeover, the name server block will be updated to reflect the change. Until the pipe server gets another "I am OK" message from the primary name server, it polls the DCT using a timer. At every timer pop, the pipe server will perform a DCT lookup to check if there is any change in the name server status.

If the DCT lookup fails, this suggests that both the primary and backup name servers are dead. All the fifo operations are terminated for the fifo that were registered with this name server process pair. The termination of these operations is handled in the same manner as described in the two-step client death processing.

In certain situations, after cpu-down processing, the pipe server and the name server can get out of sync with respect to the fifo identifiers. Consider a situation where a pipe control block will be deleted because all the clients associated with this pipe control block were on the dead cpu. In this case, no message is sent to the name server to delete the fifo identifier mapping. To correct this situation, a retry mechanism is used at the time of open( ): The pipe control block open( ) detects that the pipe control block no longer exists and returns such an indication to fifo open( ). Fifo open( ) sends a message to the name server asking to delete the mapping between the fifo and the fifo identifier. Fifo open( ) returns a indication to retry the open( ), starting from lookup.

Times Updates for Pipes and Fifos

Both pipes and fifos have three time related attributes, atime, ctime and mtime. The atime reflects the last time the data for a pipe or fifo was accessed. The ctime reflects the last time a pipe or fifo changed. The mtime reflects the last time data was written to a pipe or fifo.

The pipe( ) system call includes initial values for these times in the new pipe's pipe control block. Later, other Posix system calls on the pipe modify the times. When the last process with the pipe open executes a Posix close( ) system call, the pipe control block is removed and the times are lost. The system does not permanently store the times for a pipe.

The Posix mkfifo( ) system call adds a new fifo to a Posix file system. The name server for the file system registers the fifo in its data base. When the name server registers the fifo, it includes initial values for the fifo's times attributes. The fifo's times remain in the name server's data base until the last link to the fifo is removed. Since the data base is kept in disk files, the times in the data base persist when the system stops and starts.

As a performance optimization, the times for a fifo are cached in its pipe control block while the fifo is open. This caching avoids the need to request the name server to update the times in its data base for each function that affects the times. The fifo file system updates the name server's permanent copy of a fifo's times in the following situations: during Posix stat( ) and fstat( ) operations on a fifo, as required by the Posix standard; during a Posix close( ) by the last opener of a fifo, since the fifo's pipe control block and the cached times within the pipe control block will be destroyed; during any operation that would cause the cached times to become more than 5 minutes out of date (This attempts to keep the times kept by the name server somewhat in sync with those cached in the pipe control block in case the pipe control block's cpu fails.); and after an unopen fifo is opened, during the first operation that would cause the cached times to be out of date (This attempts to cause the times kept in the name server to reflect that the fifo has been used, in case the pipe control block's cpu fails before five minutes have elapsed.).

Table I shows information about each system call that changes the times for a pipe or fifo. If also lists some functions which operate upon pipes and fifos without changing their times. The 'argument' column of the table indicates which calls identify the fifo by providing its path and which identify the pipe or fifo by providing a file descriptor (fd). In the times column of the table, 'p' indicates the function updates the pipe control block's cached copy of the times. A 'u' indicates the function updates the times either in the pipe control block or on disk. A 'w' indicates that for fifos the function update the name servers permanent copy of the times.

TABLE I

| Operation | Argument | atime | ctime | mtime |
| --- | --- | --- | --- | --- |
| access() | path | | | |
| chmod() | path | | u, w | |
| chown() | path | | u, w | |
| close() | fd | w | w | w |
| link() | path | | u, w | |
| mkfifo() | path | u, w | u, w | u, w |
| open() | path | | | |
| pipe() | fd | p, u | p, u | p, u |
| fstat() | fd | w | w | w |
| rename() | path | | | |
| read() | fd | p, u | | |
| write() | fd | | p, u | p, u |
| stat() | path | w | w | w |
| unlink() | path | | u, w | |
| utime() | path | p, u, w | p, u, w | p, u, w |

In general, Posix requires that the times attributes of a pipe or fifo be updated only after successful file system operations. In a distributed system this rule cannot be followed. In particular, if a pipe server completes an operation such as read and updates a fifo's times, there is no guarantee that the result of the operation will reach the client process. If the result does not reach the client the operation has really failed, although the pipe server will have updated the time attributes stored in the pipe control block.

To implement updating the name server's copy of a fifo's times attributes whenever they become more than five minutes out of date, the last values of the times sent to the name server are stored in the pipe control block.

Pib operations which change the times attributes of a fifo and cause the name server's values for the time to be more than five minutes out of date will return the new times and an indication to update the name server's times. The fifo ops layer 206 will send a message to the name server with the new times.

CPU Death Failures

The implementation of pipes and fifos requires the cooperation of name servers, pipe servers and system library code. The activities of these components when a cpu fails is explained below. A basis of the design of the activities is the fact that an instance of a pipe control block is recognized by a unique fifo identifier, as described above.

When a pipe server containing a fifo's pipe control block dies, the name server deletes the fifo identifier used to identify the pipe control block from its tables. The name server treats the next Posix open( ) of the fifo as a first open( ).

Note that the pipe server and the name Server are always on the same system.

When a cpu containing a client of a pipe or fifo dies or when the pipe server looses network communication with the cpu, the pipe server frees any resources associated with the client's open of the pipe control block, continues blocked write operation if the client was the pipe control block's last reader and frees the pipe control block if no other clients have the pipe or fifo open. The client executing the write( ) receives POSIX EPIPE error and the POSIX SIGPIPE signal when the blocked operations are continued.

The pipe server does not monitor the name server's cpu using system messages, rather it uses the algorithm described earlier to recognize the death of the name server.

If one of the primary or backup name servers dies, the pipe server remembers the fact and continues to process all the requests normally. When both the primary and backup name server processes fail, the pipe server completes all pending operations returning EPIPEGONE errors and frees all resources associated with fifos registered with the dead name server. This includes the fifos' pipe control blocks and all the active client data structures.

In short, a pipe control block for a pipe or fifo is removed when its cpu fails, when its name server fails and when its pipe server looses network communication with all of its clients. In any of these situations, the Posix library code causes the following behavior with future or outstanding operations on a file descriptor for the pipe or fifo: Writes may get a SIGPIPE signal and an EPIPE error, and all operations get an EPIPEGONE signal.

When network communications is lost between the pipe server and a client, the pipe server deletes the client from the pipe control block. While the pipe server is unreachable the system library returns an error ENET_DOWN. When the pipe server becomes reachable again, it will return a reply with error EOPEN_LOST.

The VFS layer

When given a pathname as input, a lookup( ) function performs any necessary permission checks and returns enough information to find or construct a vnode for the file being opened. If the file is already open by a process on the caller's cpu, a vnode for the file already exists for the file. The lookup( ) function provides a convenient callable interface to the name server. It is the name server which performs the path resolution and security checks. In the case of a fifo, lookup( ) preferably returns the following information: the file system identifier of the fifo file system which contains the fifo; the fifo file identifier of the fifo (When a caller invokes lookup( ) on an unopen file, the name server requests the pipe server to create a pipe control block and fifo identifier for the fifo. The name server includes the fifo identifier in the file identifier.); the file system identifier of the Posix file system containing the fifo; and the Posix file identifier for the fifo's directory entry.

In a preferred embodiment, all fifo vnodes are stored on a hash chain and can be efficiently located using a key including the fifo file system identifier and the fifo file identifier. Thus, after calling lookup( ), the file system can efficiently determine if a fifo vnode already exists.

It is important to note that a fifo vnode may continue to exist after its pipe control block is deleted. For example, the pipe control block's cpu may fail while a client on another cpu has a fifo open. This can lead to two situations: One, the name server knows the pipe control block is gone and deletes its fifo identifier. When lookup( ) is called in this case, the name server thinks the fifo is not open. It requests a pipe server to create a pipe control block and unique fifo identifier for the fifo. The name server returns the new, unique fifo identifier to lookup( ) which returns a new fifo file identifier to the VFS layer. Since the fifo file identifier is new, the VFS layer will not find a vnode with the new file identifier on the hash chain. Having failed to locate the vnode, the VFS layer will allocate it. The clients using the fifo's original vnode will clean it up when they attempt to use it and learn the pipe control block it references is gone. The second case is when the name server does not know the pipe control block is gone and remembers its fifo identifier. When lookup( ) is called in this case, the name server returns the file identifier for a pipe control block which is gone. The VFS layer will find or allocate a fifo vnode. Later, when the fifo ops layer attempts to open the fifo it will get an error. At that time the fifo ops layer will delete the fifo vnode if no other processes were using it and will notify the name server to delete the fifo's file identifier from its tables. Next the VFS layer will retry the lookup( ).

Notice that the Posix lookup( ) function returns enough information to build a Posix vnode 304 for the fifo's directory information. The Posix vnode 304 associated with the fifo is used for operation on the fifo's directory entry.

As noted above, when lookup( ) is called during an open of an unopen file, the pipe server creates a pipe control block for the fifo. In addition, the pipe server creates a client block client to indicate that the caller of lookup( ) is using the fifo. The fifo ops layer 206 completes the open( ) as a second distinct operation on the pipe control block. The operation data structure used to perform the open( ) preferably contains the unique fifo identifier, extracted from the fifo's file identifier; the underlying operating system's process identifier of the opener; and a reserved open identifier indicating that the resource is not open (NOT_OPEN).

Though a single process can open a fifo more than once, it can only perform one Posix open( ) call at a time. If open( ) fails, the client data structure will be freed. If open( ) succeeds, the client will be associated with an open identifier other than NOT_OPEN. The new open identifier will not be used by any other opener of the fifo. This assures that no single client process will ever have more than one client whose open identifier equals the special value NOT_OPEN. In other words, the triplet (fifo identifier, client process identifier, open identifier) always uniquely identifies a client.

The Fifo Fs Layer

In the fifo fs layer 208, a function allocate_vnode( ) allocates a fifo vnode. It also allocates the 'shadow' Posix vnode associated with the fifo's directory entry. If allocating the first vnode within a particular file system, it also allocates a vnode_vfs structure. The function is to be executed under the protection of the allocation semaphore.

(In the code examples below, 'fsid,' 'fid,' 'dirEntryVp,' 'pib,' 'pob' are contractions for file system identifier, file identifier, directory entry vnode pointer, pipe control block, and Posix open block, respectively.)

```
allocate_vnode(fifo fsid,
               fifo fid,
               Posix fsid, /* for dir entry */
               posix fid, /* for dir entry */
{
    if (first vnode in fifo's file system)
        Allocate and initialize the file system's vnode_vfs
        struct
        Add new vnode_vfs structure to vnode_vfs_list
    /* Allocate and initialize the vnode for the fifo's
    directory        entry.
    */
```

```
        dirEntryVp = VFS_ALLOCATEVNODE( Posix fsid, Posix fid)
        vnp = allocate the fifo vnode
        vnp.v_fid = fifo fid
        vnp.v_op = operation structure for fifo file system
        vnp.file_type = fifo
        add new vnode to hash chains
        vnp.v_vnode_vsp = vnode_vfs struct for fifo's file system
        bump reference count of vnode_vfs struct for fifo's file
          system
        vnp.dirEntryVp = dirEntryVp
}
```

As described above, the name server requests the pipe server to create a pipe control block and client block for an unopen fifo during lookup( ) processing. In case an error prevents the Posix library code from following a successful lookup( ) with an fifo open( ), the fifo fs client_open function frees the pipe control block resources already allocated.

```
client_open(fifo fsid,
            fifo fid,
            Posix fsid,    /* for dir entry */
            Posix fid,     /* for dir entry */
            Client process Id)
{
    If pib with matching fifo fsid, fifo fid, Posix fsid and
            Posix fid exists
    {
        if client block with open_id = NOT_OPEN and
            matching client process Id
                free client block
        if no clients remaining
            free pib
    }
}
```

The fifo fs function pob_len returns the length of the fifo file system-dependent extension to an Posix open block. This function is to be executed under the protection of the allocation semaphore.

The fifo fs function free_vnode frees a fifo vnode. This function is only called if the vnode is not in use.

```
free_vnode(vnode_to_free_p)
{
    p(vnode_to_free_p—>semaphore.x)
    remove vnode from hash chain;
    v(vnode_to_free_p.semaphore)
    VOP_DEALLOCATE(vnode_to_free-P—>dirEntry_vp);
    free vnode_to_free-p;
}
```

The fifo fs functions emTobInfo and emTnodeInfo returns the information stored in the tob structure contained within a Posix open block and all the information contained within the tnode structure contained within a vnode, respectively. These two functions are executed in the cpu where the migration of a process to a cpu is initiated.

The fifo fs emVnodeAlloc function takes the vnode and tnode info passed by the migrating process and builds the vnode, locates or builds the vnode_vfs structure and attaches the vnode ops structures to the vnode. All this is done under the protection of the vnode semaphore. The function returns the pointer to the allocated vnode.

Finally, the fifo fs emSharablePob function takes the tob and tnode information received from the migrating cpu and a pointer to a pob that is checked for being sharable. If the pob to be shared is found, the function returns an indication whether the pob is sharable.

Figure 5:
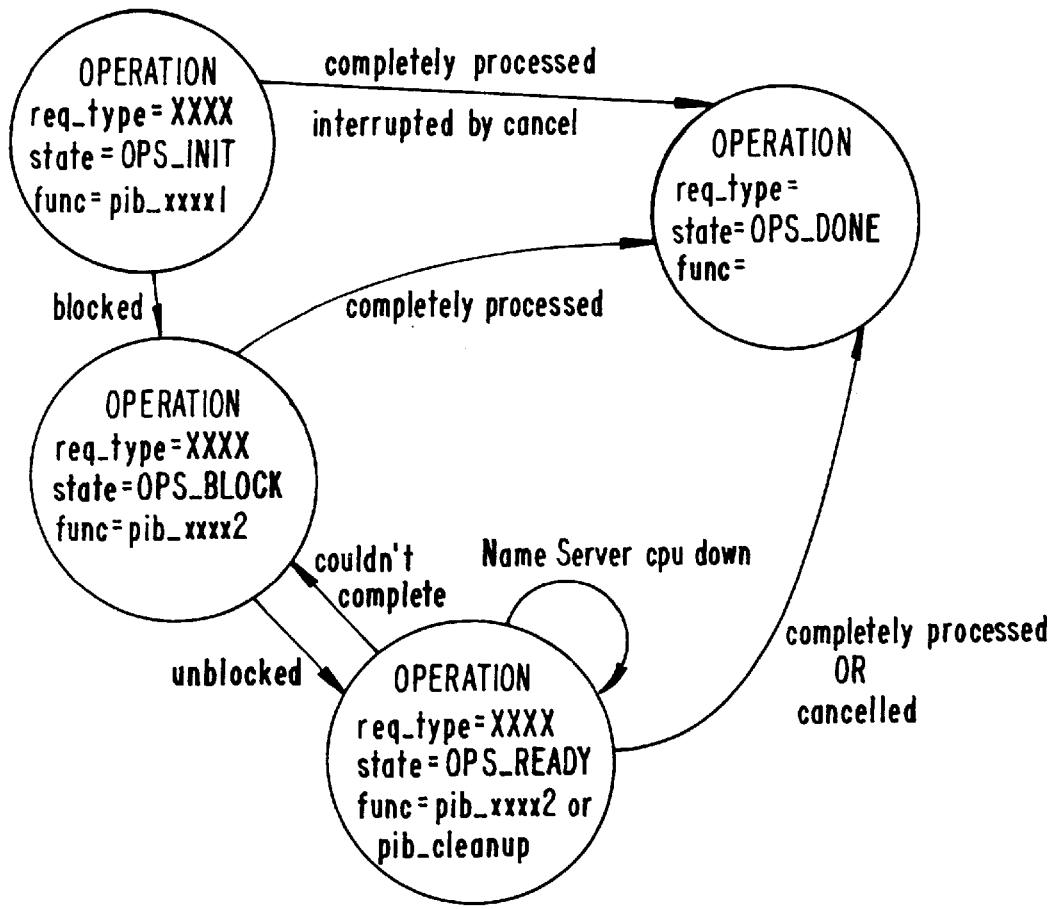
FIGS. 5 and 6 are state transition diagrams for requests on a fifo and a pipe, respectively.
Figure 6:
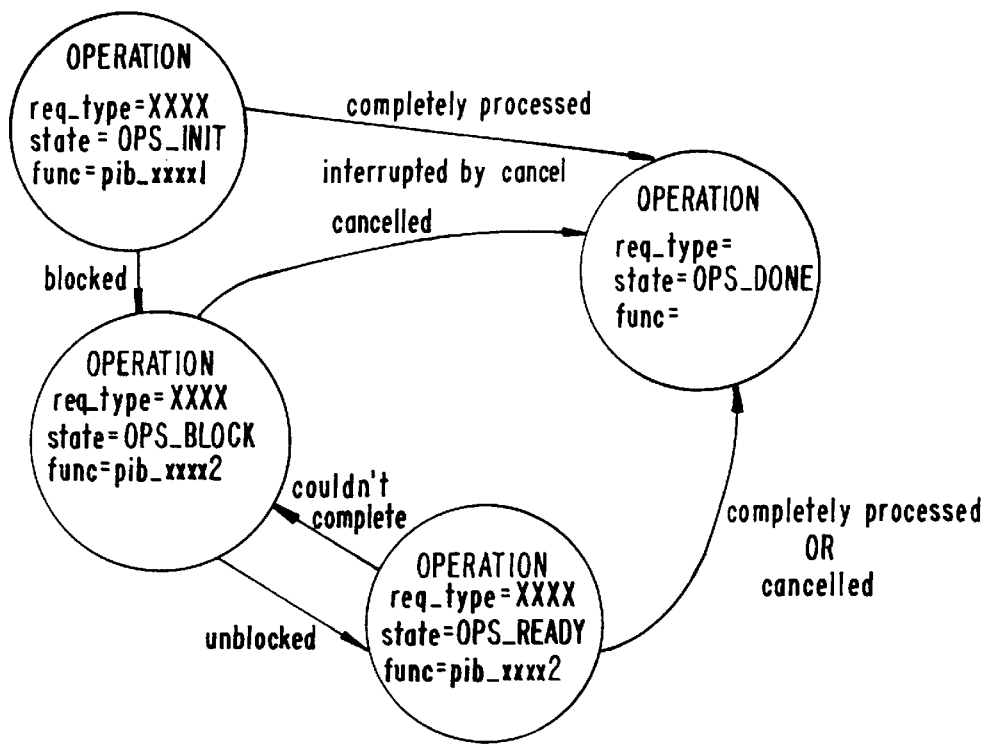

FIGS. 5 and 6 are state transition diagrams for requests on a fifo and a pipe, respectively. The fifo ops layer 206 sets up an operation data structure and invokes the pipe control block interface PerformRequest function which performs requests with an operation data structure and an interruptability flag as parameters. The fifo ops layer 206 sets the operation type in the operation data structure based on the function being performed and sets the operation state data structure to INIT. For example, for a fifo read( ), the type of the operation and the state would be READ and INIT, respectively. Between them, the type and state elements of the operation data structure define a pipe control block operation for execution.

The PerformRequest function decides whether the execution of a requested pipe control block operation will be local or remote. At any given time and for a given client, the type of operation requested and the state elements of the operation data structure reflect the state of the function performing the requested operation. This function sends a message containing the operation structure to the associated pipe server on a remote cpu if the execution is to be remote.

In local execution, the return status from a pipe control block operation reflects whether or not PerformRequest needs to drive the next pipe control block operation. If a pipe control block operation cannot complete, the software will change the state of the operation data structure to blocked and return an indication of a blocked status. In this case, a pipe server services other requests. The blocked function waits for an LPIPE or LSIG event before resuming the next pipe control block operation.

The LPIPE event can be generated by the pipe server or from the context of another process executing pipe control block operations locally. Before generating an LPIPE event for the pipe server, all blocked operations are set to the ready state and are chained onto the ready list. Before generating an LPIPE event for local pib operations, the software changes the state of the operation data structure to READY.

If the local execution is interrupted by an LSIG event while the operation is blocked or ready state, RequestMyCpu will set up a new operation data structure to perform the cancel operation. In local execution, the cancel is executed immediately. With remote execution, an LSIG event satisfies a wait, and a message with the cancel operation data structure is sent to the pipe server. The cancel operation will cancel the pending operation in the BLOCKED or READY state and will return the cancelled status back to PerformRequest which will in turn complete the fifo ops function.

If the name server process pair dies while the pipe control block operation is in the BLOCKED or READY state, the next operation is set up to do a cpu-down cleanup operation, and the operation state is set to READY. When the cpu-down cleanup function is executed, it completes the pending PerformRequest function with the necessary return information. The pipe control block representing a pipe will never transition in this fashion as pipes are not registered with any name server.

The various fifo operations preferably supported by the pib ops layer 212 are described below:

Only a pipe server invokes the creation of a pipe and invokes the fifo ops functionality in response to a fifo creation message from a name server. In processing a request for creation of a pipe, the fifo ops layer 206 allocates space for the pipe control block and client data structure and generates a unique sequence number. The fifo ops layer 206 then stores the process identifier of the process which initialized the lookup (for later use in identifying the client during an open operation). For the open identifier, the fifo ops layer 206 stores the special NOT_OPEN identifier.

Fifo Open: Fifo open is invoked after the successful execution of a lookup. A fifo open sets up an operation data structure with its operation type and state being OPEN and INIT, respectively. Fifo opens can be executed locally or remote. In case of remote execution, the RequestOtherCpu( ) sends a message containing the operation data structure to the associated pipe server.

The open request is preferably divided into two pib operations, a first which determines whether the open request should block after the allocation of new structures and a second which executes when the first operation is unblocked. After executing the PerformRequest( ) successfully, the fifo Open( ) function stores the open identifier returned by PerformRequest( ) in the Posix open block data structure.

The open request is for fifos only. For pipes, an open is part of a pipe's creation.

If the fifo open is interrupted and a pending operation is to be cancelled, the next operation will execute a cancel pib operation.

Figure 7:
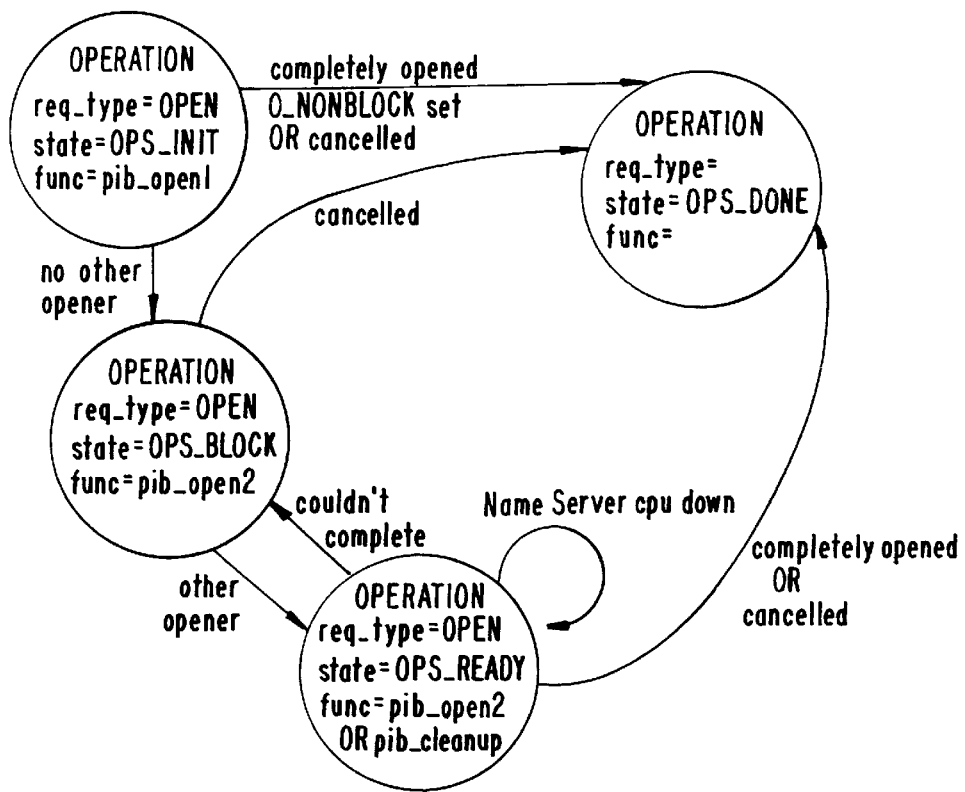
FIG. 7 is a state transition diagram for an open request on a fifo.

FIG. 7 is a state transition diagram for an open request on a fifo.

Open Pib Operation, First Division: The first division of the open pib operation discussed above finds the pipe control block using the fifo identifier which has its unique sequence number and pipe control block number. If the operation cannot find the pipe control block with the unique sequence number in the fifo identifier, the open operation returns an error indicating that the overlaying software should retry. After detecting this error and cleaning up all the data structures which might have been allocated, the fifo open retries. Such cleaning up would be necessary when a pipe server deletes the pipe control block, and the name server could not be notified to delete the fifo identifier mapping from its table.

Upon finding the pipe control block with the unique sequence number, the first division of the pib open operations performs a special protocol required for fifos. This protocol includes storing the open flags for the open in an open control block associated with the client; generating and storing the open identifier for the open in the open control block; clearing the flag indicating that the I/O is non-blocking for fifos performing opens for blocking I/O (Preferably, the first division will block if the fifo open is opening the fifo for reading only until another process opens the fifo for writing (and vice versa)); and completing and returning without delay for fifos performing opens for non-blocking I/O, setting the flag indicating that I/O is non-blocking in the process. For non-blocking read access, the first division returns successfully. For non-blocking write access when no process has the fifo open for read access, the open pib operation returns an error indicating that I/O requested refers to a device which does not exist or unable to perform the function.

If the operation blocks, the state of the operation data structure becomes BLOCKED; the next function to be executed will be set up as the second divisional open pib operation; and the operation is chained onto the pipe control block's open waiter list, the list of open operations waiting for another type of opener.

If the fifo open operation is BLOCKED or READY when the first division of the open pib operation receives a cpu-down request for the client to which this operation belongs, the state of the operation is set to READY and the next operation is set up to be the cleanup. In a normal case when a blocked request is unblocked and the state of the operation is READY, the next operation is the second divisional open pib operation.

Open Pib Operation, Second Division: The second divisional open pib operation discussed above executes when the first divisional open pib operation unblocks. After opening successfully, this second open operation wakes up all the blocked open operations waiting for completion. Before completing, the second divisional open pib operation generates an LPIPE event for all of the unblocked local operations, chains the unblocked remote operations to the ready list and generates an LPIPE event to the pipe server.

On successful completion, the fifo open returns an open identifier to the calling process and the state of the operation is set as COMPLETED. The operation may block again if no other openers are found on execution. This condition is the result of a time delay between receiving an LPIPE event and being scheduled to run. Also, time delays can occur when a process attempts to acquire the pipe semaphore.

Pipe Create: In the present invention, a call to pipe( ) creates a local pipe control block. The pipe server local to the caller's cpu is responsible for maintaining this pipe control block. The pipe create operation never blocks and upon successful completion returns two open identifiers for association with a reader and a writer.

The pipe create operation allocates a pipe control block data structure, two client data structures and two open control blocks associated with the client data structures. The pipe create operation also generates two open identifiers for storage in the respective two open control blocks. The operation sets one client to be the pipe reader and the other to be the pipe writer.

Fifo Fork: As explained above, a parent process creates a child process using the fork( ) system call. Upon its creation, the child inherits all of the open files of the parent. For every pipe or fifo file descriptor the parent has open, the child calls the fifo fork operation indirectly. The fifo fork operation sets up an operation data structure with its state set to INIT and the operation type of FORK_OPEN in order to perform a fork open pib operation via the pipe control block interface layer 210.

If the fork( ) call spans cpus and no fifo vnode exists for the pipe or fifo on the child's cpu, the fifo fork operation creates a fifo vnode. The new fifo vnode refers to the pipe or fifo's pipe control block via a fifo identifier. The child must invoke the fifo fork operation in order to create this fifo vnode on the child's cpu.

If the fork( ) system call results in the creation of a new Posix open block for the child, the fifo fork operation bumps the reference count of the fifo vnode data structure on the child's cpu. The caller must specify whether the fork( ) required the creation of a new Posix open block.

Fork Open Pib Operation: The fork open pib operation never blocks. The operation performs two functions: First, the function adds a client entry in the pipe control block for the child process. To reflect the fact that this is a shared open, the caller provides the open identifier found in the parent's Posix open block. Second, the function stores this shared open identifier in the new client entry. This new client's pointer to an open control block points to the already existing open control block with the open identifier provided in the operation data structure.

There are no state transitions during this pipe control block operation. It is a one-step operation.

Fifo Close: The fifo close function frees any resources associated with a particular use of a fifo or pipe by the caller. This will set up an operation data structure with the operation type and state set to CLOSE and INIT, respectively, which will drive the close pib operation. The operation control information is set using the caller's fifo identifier, process identifier and open identifier. The fifo close request is a single-step operation with no state transitions.

After completing the corresponding pib operation, the fifo close decrements the use count in the fifo's fifo vnode on its own cpu. If this use count drops to zero, the fifo close frees the fifo vnode and the Posix vnode 408 for the fifo's directory entry. For pipes, there is no Posix vnode association with the fifo vnode.

The fifo close checks the reply of the close pib operation to see whether this close was the last close of the fifo. If so, the operation sends a fifo 'last close' message to the name server holding this fifo identifier. Upon receipt of the fifo close message, the name server removes the pipe control blocks fifo identifier from its tables. The message to the name server also contains the final times from the pipe control block.

Close Pib Operation: The close pib operation frees the client list entry which registers the caller's use of the fifo in the pipe control block of the fifo. The operation also decrements the reference count of the fifo's pipe control block. If the caller is the last user of the pipe control block of the fifo, the operation frees the pipe control block and replies with enough information so that a fifo close message can be sent to the name server.

Before returning, the pipe control block close operation unblocks all the blocked readers is all the writers are closed. The unblocking will change the operation state from BLOCKED to READY and generate a LPIPE event for local processes and for the pipe server after moving remote operations to the ready list.

Fifo Fcntl: The fifo fcntl function implements control function on an open pipe or fifo. TABLE II shows the action taken by fifo fcntl for each Posix fcntl( ) system call.

TABLE II

| Command | Return Value | Errno |
|---|---|---|
| F_DUPFD | 0 | 0 |
| F_GETFD | 0 | 0 |
| F_SETFD | 0 | 0 |
| F_GETFL | Status flags-Access modes/-1 | 0/EPIPEGONE |
| F_SETFL | 0/-1 | 0/EBADFLAG EPIPEGONE |
| F_GETLK | -1 | EINVAL |
| F_SETLK | -1 | EINVAL |
| F_SETLKW | -1 | EINVAL |

The only status flag which can be changed for pipes and fifos is the non-blocking flag.

The fifo fcntl operation returns constant information for most commands. The exception to this are the F_GETFL and F_SETFL commands which get and set attributes of an open. Since an open may be shared by processes in different cpus, these attributes are stored in the open control block. The caller must provide the fifo identifier, the client's process identifier and an open identifier to uniquely identify the open control block to the corresponding pipe control block ops fcntl operation.

The PerformRequest( ) executes RequestOtherCpu( ) which sends a message to the pipe server to execute the fcntl pib operation. The operation type and state are set to FCNTL and INIT, respectively.

Fcntl Pib Operation: This operation sets and retrieves the attributes of an open for a given process identifier and an open identifier. This is done using the F_SETFL and F_GETFL in the fcntl( ) system call. This pipe control block ops operation is a one-step operation which never blocks. Accordingly, there are no state transitions.

The F_GETFL command fails and sets errno to EPIPEGONE if the fifo or pipe has been deallocated. This deallocation can occur if the pipe server responsible for the pipe control block of the pipe or fifo dies. The F_SETFL command fails if the user tries to set an undefined flag (EBADFLAG) or the pipe control block of the pipe or fifo has gone away (EPIPEGONE).

Fifo Read: The fifo read function reads data from a pipe or fifo and returns it to the caller. Any data read is also removed from the fifo. The fifo read operation requires that the pipe or fifo be open for reading. If the fifo read function transfer any data to a caller, the operation returns the number of bytes transferred—even if a signal interrupts the read.

The PerformRequest( ) for fifo read can be a multi-step operation if the initial read pib operation has to be blocked. In case a signal interrupts fifo read, the pib operation is to be cancelled and the cancel pib operation executes next.

Read Pib Operation: A read pib operation of a non-empty pipe or fifo containing fewer bytes than are requested returns whatever data is available in the pipe or fifo.

A read pib operation of an empty pipe or fifo returns a first value (0) to indicate EOF if no process has the pipe or fifo open for writing. Otherwise, the operation returns a second value (-1) and sets errno to EAGAIN if the open flag for non-blocking I/O is set.

If the client was opened with the non-blocking I/O open flag clear and there was no data to read in the pipe control block, the function sets up the next operation to be executed and the client is added to the pipe control block's read wait list. Otherwise, the function blocks until some data is written or the pipe is closed by all processes which had the pipe open for writing. At this point the read operation returns the number of bytes actually read, which can be zero.

After reading some or all bytes successfully, the read pib operation will wake up all the blocked write operations waiting to write to the pipe control block buffer. Before returning, the read operation sends a LPIPE event to all of the unblocked local operations, chains the un-blocked remote operations to the ready list and sends a PIPE event to the pipe server.

In the event the operation is in a blocked or ready state and fifo read receives a cpu-down request for the client to which this operation belongs or in the event the name server process pair dies (only for fifos), the state of the operation is changed to READY and the next operation is set to be a cleanup pib operation. In the normal case, when a blocked request is unblocked and the state is set to ready, the next pib operation is the same as the current operation, i.e., a read pib operation.

Figure 8:
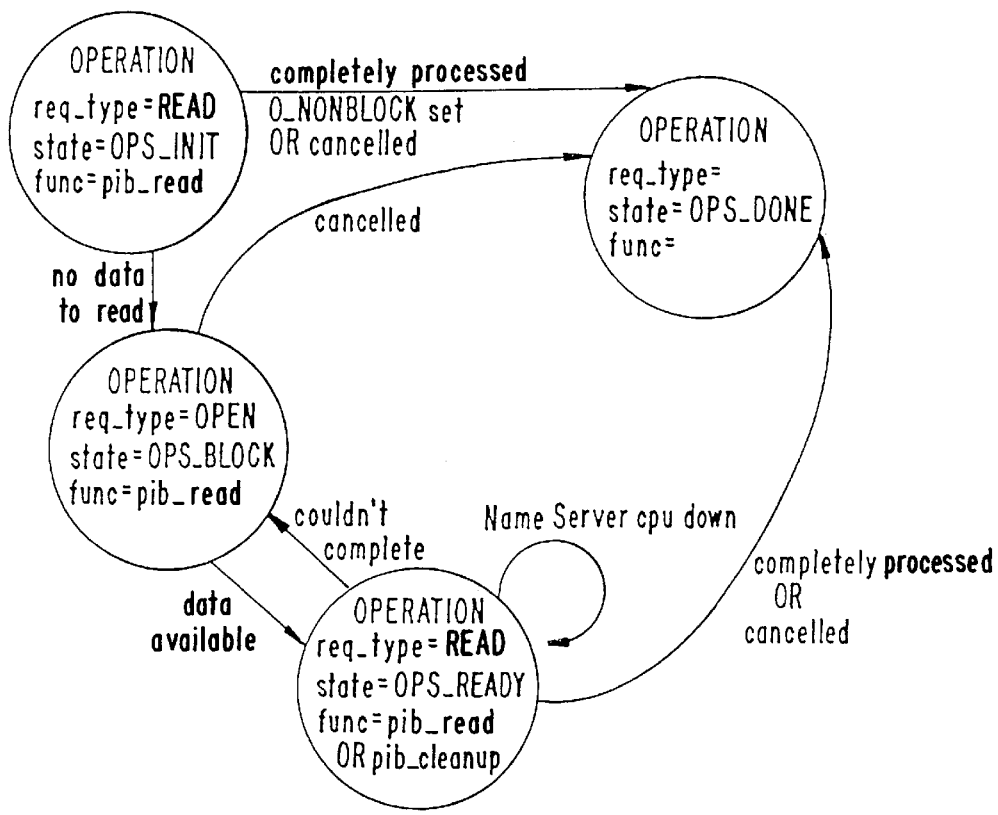
FIG. 8 is a state transition diagram for a read request on a fifo.

FIG. 8 is a state transition diagram for a read request on a fifo.

Fifo Write: The fifo write function writes data to a fifo or pipe. The data is written to the end of the pipe or fifo and will be read only after all of the existing data in the pipe or fifo has been read. The fifo write operation does not interleave write requests not greater than PIPE_BUF (i.e., the maximum number of bytes which can be written atomically when writing a pipe) with data from other processes doing writes on the same pipe. The fifo write operation may interleave writes larger than PIPE_BUF on arbitrary boundaries with writes from other processes. If a signal interrupts a write which has transferred some data to a pipe or fifo, the fifo write operation returns the number of bytes it has actually transferred.

If a process attempts to write to a pipe or fifo which is not open by any readers, the process receives an EPIPE error and SIGPIPE signal. In the case where a process is attempting to write to a local pipe control block, the process sends the signal to itself. In the case where the process is writing to a remote pipe control block via a pipe server, the pipe server responds to the caller's request with an errno. Once again the process sends the signal to itself.

The PerformRequest( ) for a fifo write can be a multi-step operation. The initial write pib operation can block. In case fifo write is interrupted and the operation is to be cancelled, the cancel pib operation executes next. Fifo write will set up an operation data structure with an INIT operation state and WRITE operation type.

Write Pib Operation: If the flag for non-blocking I/O is clear, a pipe control block write request may cause the caller's process to block, but on normal completion, the operation will have transferred all the data which the caller requested. If the flag for non-blocking I/O is set, then the write operation traverses the following decision tree: If the caller wishes to write data not greater than PIPE_BUF and the pipe or fifo has room for the data, the operation transfers the data. If the caller wishes to write data not greater than PIPE_BUF and the pipe or fifo does not have room for the data, the operation does not transfer any data and returns a first value (−1) with errno set to EAGAIN. If the caller requests to write data larger than PIPE_BUF and the pipe or fifo has room for at least 1 byte, the operation transfers at least 1 byte before completion. If the caller requests to write data larger than PIPE_BUF and the pipe or fifo has no room for any data, the operation returns an error −1 with errno set to EAGAIN.

After writing some or all of the bytes successfully, the write pib operation will wake up all the blocked read operations waiting to read from the pipe buffer. The write operation generates a LPIPE event to all the unblocked local operations, chains the unblocked remote operations to the ready list and generates an LPIPE event to the pipe server.

If the operation is blocked or ready when fifo write receives a cpu-down request for the client to which this operation belongs or if the operation is blocked or ready when the name server process pair dies, the state of the operation becomes READY and the write pib operation sets up the cleanup pib operation as the next operation. In the normal case, when a blocked request is unblocked and the operation state is ready, the next operation is the same as the current operation, i.e., a write pib operation.

Figure 9:
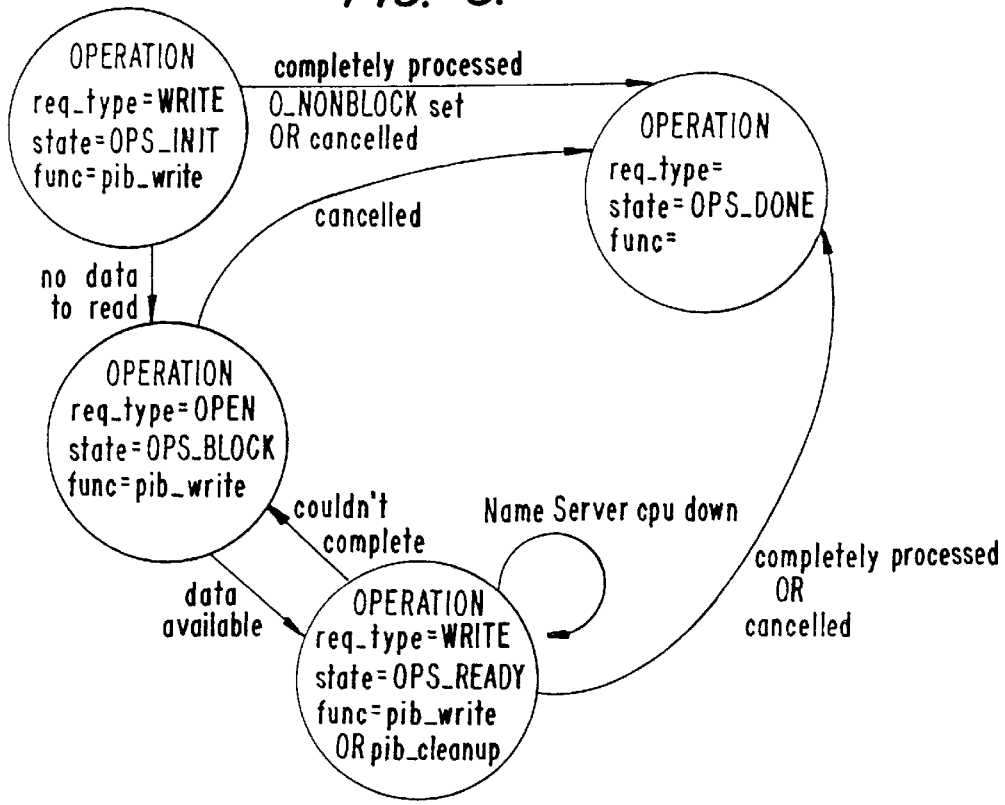
FIG. 9 is a state transition diagram for a write request on a fifo.

FIG. 9 is a state transition diagram for a write request on a fifo.

Fifo Getattr: The fifo getattr function collects the information required to fill in the stat data structure (described above) for a pipe or fifo. For fifos, the name server maintains all of the fields of the stat data structure in its data base. In addition, the fifo's pipe control block contains the time-related fields of the stat data structure. The fifo getattr function has the responsibility of sending the time stored in a fifo's pipe control block to the name server before returning.

The stat data structure preferably contains an inode, a unique number generated to represent each pipe within a fifo file system; an identifier for the device containing the fifo; the number of links to the fifo; the user identifier of the owner of the fifo; the group identifier of the group of the file; the number of bytes available for reading in the pipe data buffer; the time of last access of the fifo; the time of last data modification of the fifo and the time of last file status change for the fifo.

The fifo getattr function provides the modification time, the inode, the device identifier, the number of links, the user identifier and the group identifier of a fifo. The getattr pib operation fills in the rest of the information.

Getattr Pib Operation: This function returns the times stored in the pipe control block for the active pipes and fifos. This function also sets the value of the access, modification and change times. The library on the caller's cpu or the pipe server (if the caller is on some other cpu) can invoke the getattr pib operation.

Fifo Setattr: The fifo setattr vnode operation sets various directory attributes of a fifo. For the active fifos, the access, modification and status change times are cached in the pipe control block of the fifo. If the pipe control block is local to the cpu, then PerformRequest( ) calls the setattr pib operation locally, else it sends the times in a remote message to the pipe server controlling the pipe control block. In this case, the pipe server updates the times sent in a message by invoking the setattr pib operation.

Setattr Pib Operation: This function updates the cached times in the pipe control block to reflect the new times. This function can change all three times in the pipe control block.

Fifo Pathconf: For a fifo, the fifo pathconf function provides a method for the application to determine the current value of a configurable limit or option associated with a named file or directory. The function always calls the Posix pathconf( ) function for the fifo's directory entry.

For a pipe, the fifo pathconf function preferably supports the following named configurable limits or options: _PC_LINK_MAX (The maximum number of links to a pipe is always 0); _PC_PIPE_BUF (The returned value is always defined in unistd.h); and _PC_CHOWN_RESTRICTED (The returned value is always −1, indicating the operation is restricted).

Fifo Seek: This function always fails and sets errno to EPIPE.

Fifo Em Shareopen: This function takes tob and tnode information on the target cpu with the information received from the migrating cpu. The function updates the tob and tnode on the target cpu with the information received. This function invokes the exec migrate pib operation after setting up the request structure.

Fifo Em Openmigrate: This function invokes the exec migrate pib operation after setting up the request structure.

Exec Migrate Pib Operation: This function allocates a new client block and copies all the relevant information from the migrating client to this new client structure. The exec migrate pib operation also points the new client block to the open control block of the migrating client. The migrating client will be deleted when a close pib operation is performed for that client. This is a one-shot operation.

Of course, variations on the above teachings will be readily apparent to one of ordinary skill in the art. For example, the names of services can be readily changed without affecting the operation of the invention.

What is claimed is:

1. In a computer system having a plurality of processors, each of said plurality of processors having a respective memory, a method for accessing a first-in/first-out, read-once file, said method comprising:

coupling said plurality of processors by means of an inter-processor communications link;

requesting on a first of said plurality of processors a service in a file system-independent manner with respect to said file, thereby creating a service request;

converting said service request to a file system (FS) dependent and a file system implementation (FSI)-independent service request;

converting said FS-dependent and FSI-independent service request to a FS-dependent and FSI-dependent service request; and forwarding said service request to one of said plurality of processors for performance.

2. The method of claim 1 wherein said file is unnamed.

3. The method of claim 2 further comprising the step of allocating a data structure enabling operations on said file itself.

4. The method of claim 1 wherein said file is named.

5. The method of claim 4 further comprising the steps of allocating a first data structure enabling operations on a directory entry for said file; and allocating a second, distinct data structure enabling operations on said file itself.

6. The method of claim 1 further comprising the step of locating said file on one of said plurality of processors; and wherein said step of forwarding comprises determining the location of said file; and forwarding said service request to said first processor if said first processor is the location of said file; and forwarding said service request to another of said plurality of processors by means of an inter-processor message interface if said first processor is not the location of said file.

7. The method of claim 6 wherein said step of forwarding said service request to said first processor if said first processor is the location of said file comprises forwarding said service request to said first processor by means of an intra-process procedure if said first processor is the location of said file.

8. An article of manufacture comprising, a communications link;

a plurality of processors intercoupled by the communication link, each of the plurality of processors having a respective memory wherein is located a computer program for causing such processor to access a first-in/first-out, read-once file by requesting on a first of said plurality of processors a service in a file system-independent manner with respect to said file, thereby creating a service request;

converting said service request to a file system (FS)-dependent and a file system implementation (FSI)-independent service request;

converting said FS-dependent and FSI-independent service request to a FS-dependent and FSI-dependent service request; and forwarding said service request to one of said plurality of processors for performance.

9. An article of manufacture comprising a medium for data storage wherein is located a computer program for causing a processor between or among a plurality of processors, coupled by means of an inter-processor communications link and each having a respective memory, to access a first-in/first-out, read-once file by requesting on a first of said plurality of processors a service in a file system-independent manner with respect to said creating a service request;

converting said service request to a file system (FS) dependent and a file system implementation (FSI)-independent service request;

converting said FS-dependent and FSI-independent service request to a FS-dependent and FSI-dependent service request; and forwarding said service request to one of said plurality of processors for performance.

\* \* \* \* \*